United States Patent [19]
Higginson

[11] Patent Number: 5,755,122
[45] Date of Patent: May 26, 1998

[54] STEERING WHEEL LOCK

[76] Inventor: Mark Christopher Higginson, Charnock Richard Preston Road. Chorley, Lancashire, PR7 5HH, England

[21] Appl. No.: 532,772
[22] PCT Filed: Mar. 31, 1994
[86] PCT No.: PCT/GB94/00685
§ 371 Date: Sep. 28, 1995
§ 102(e) Date: Sep. 28, 1995
[87] PCT Pub. No.: WO94/22695
PCT Pub. Date: Oct. 13, 1994

[30] Foreign Application Priority Data

Apr. 2, 1993 [GB] United Kingdom ............... 9306949

[51] Int. Cl.$^6$ ..................................... B60R 25/02
[52] U.S. Cl. ..................... 70/209; 70/237; 70/226
[58] Field of Search ..................... 70/209, 211, 212, 70/225, 226, 237, 238, 19

[56] References Cited

U.S. PATENT DOCUMENTS

| | | | |
|---|---|---|---|
| 1,154,389 | 9/1915 | Fogalsang | 70/209 |
| 1,329,913 | 2/1920 | McGuire | 70/209 |
| 1,368,054 | 2/1921 | Recher | 70/212 |
| 1,448,658 | 3/1923 | Furber | 70/226 |
| 3,982,602 | 9/1976 | Gorman | 70/212 |
| 4,848,110 | 7/1989 | Kuo | 70/238 |
| 5,129,245 | 7/1992 | Chang | 70/211 |
| 5,267,458 | 12/1993 | Heh | 70/238 |
| 5,297,406 | 3/1994 | Lin | 70/209 |
| 5,353,614 | 10/1994 | Anderson | 70/226 |
| 5,415,018 | 5/1995 | Ferrante | 70/226 |
| 5,450,736 | 9/1995 | Volkmar | 70/226 |
| 5,454,240 | 10/1995 | Whitney | 70/226 |
| 5,537,847 | 7/1996 | Dalton et al. | 70/226 |
| 5,540,067 | 7/1996 | Kim | 70/209 |
| 5,548,983 | 8/1996 | Hart | 70/237 |
| 5,613,383 | 3/1997 | Banez | 70/209 |

FOREIGN PATENT DOCUMENTS

| | | | |
|---|---|---|---|
| 2520313 | 7/1983 | France | 70/237 |

*Primary Examiner*—Darnell M. Boucher
*Attorney, Agent, or Firm*—Thomas R. Vigil

[57] ABSTRACT

Two hinged parts (12) and (14) are moved about a pivot (34) to trap a steering wheel between them. A pivotally mounted locking bar (22) on the part (12) has openings (30). The bar (22) could be swung down about its pivot (32) such that a selected one of these openings moves over a loop (28) extending on the other half (14). A padlock can then be passed through the loop (28) to lock the device in position. In a storage configuration the locking bar (28) can be swung down into the space normally occupied by the wheel and trapped between the two parts.

6 Claims, 2 Drawing Sheets

STEERING WHEEL LOCK

The present invention relates to a steering wheel disabling device, a disabling device mounted on the steering wheel and a method of mounting a disabling device on a steering wheel.

In a known device for attempting to prevent sufficient rotation of a steering wheel to enable a vehicle to be driven, a pair of telescopically slidable members are placed across a wheel. The members are slid away from each other to cause outwardly facing lugs on each member to engage with opposite sides of the wheel. The members are then locked to prevent further relative sliding movement. As a portion of the device projects a significant way beyond the diameter of the wheel, any undue rotational movement of the wheel and therefore the device causes the projection to hit another part of the car or the legs of the driver.

It has been found that such known devices are able to be removed by joyriders who saw through the steering wheel, bend apart the severed parts, and slide the lugs through the gap created to remove the device. Accordingly, no matter how strong the device is made, the ability of the device to prevent theft of the vehicle is only dependent upon the strength of the wheel.

It is an object of the present invention to attempt to overcome at least some of the previous disadvantages.

According to one aspect of the present invention a steering wheel disabling device is adapted to restrict rotation of a steering wheel, the device being movable from a first configuration in which, in use, the device extends over opposed outwardly facing surfaces of a steering wheel and is retained on the wheel with a projection of the device being arranged to restrict rotation of a steering wheel about the axis of rotation of a steering wheel, and a second configuration in which the device can be mounted on or removed from a steering wheel.

When such a device is mounted on a steering wheel the opposed outwardly facing surfaces of the steering wheel over which the device extends are concealed by the device and are not accessible by a saw and consequently the vulnerability of the steering wheel to sawing and bending of the wheel with subsequent removal of the device is reduced. In particular, any cut to be made through the steering wheel from the outer diameter where the device is located and where the saw traditionally enters the wheel first has to pass through the device. Consequently, the strength of the device can be increased to make the time taken to cut through the device unrealistic for anyone but the most determined thief.

The device may include portions arranged, in use, in the first configuration, to extend adjacent to either side of the outwardly facing surface of the steering wheel. Those portions may provide, together with the part of the device which extends over the outwardly facing surface of the steering wheel, a channel through which the steering wheel extends.

The device may be arranged to substantially surround a steering wheel, in the first configuration.

The device may comprise two parts which are pivotally connected to be movable from the second to the first configuration, and the two parts may be directly pivotally connected.

The device may include a cover arranged to extend over a steering wheel, when the device is in the first configuration and mounted on a steering wheel.

The device may include a locking portion movable from a first position in which the device is constrained to remain in the first configuration and a second position in which the device may be moved to the second configuration. The locking portion may be arranged to connect two parts of the device at different relative distances from each other. The locking portion may comprise the projection of the device. The locking portion may be pivotally mounted on another part of the device such that the locking portion can pivot from the first to the second position.

The device may be arranged to at least partly obscure a locking device arranged to cooperate with the disabling device to retain the locking portion in the first position.

The device may be adapted to be able to occupy a storage position in which the projection extends at least partly into the space arranged to be occupied by a steering wheel when the device is in the first configuration.

According to another aspect of the present invention a disabling device as herein referred to is mounted on a steering wheel, the device extending over opposed outwardly facing surfaces of the steering wheel with a projection of the device extending to restrict rotation of the steering wheel.

According to another aspect of the present invention a method of mounting a disabling device on a steering wheel comprises mounting parts of the device to extend over opposed outwardly facing surfaces of the steering wheel with a projection of the device extending from the wheel and restricting rotation of the steering wheel and operating locking means to prevent unauthorised removal of the device from the steering wheel.

The disabling device may be as herein described.

The present invention may be carried into practice in various ways but one embodiment will now be described by way of example and with reference to the accompanying drawings, in which:

FIG. 1 is a rear view of a steering wheel clamp 10 with hinged parts 12 and 14 in a closed position;

Figure 1:
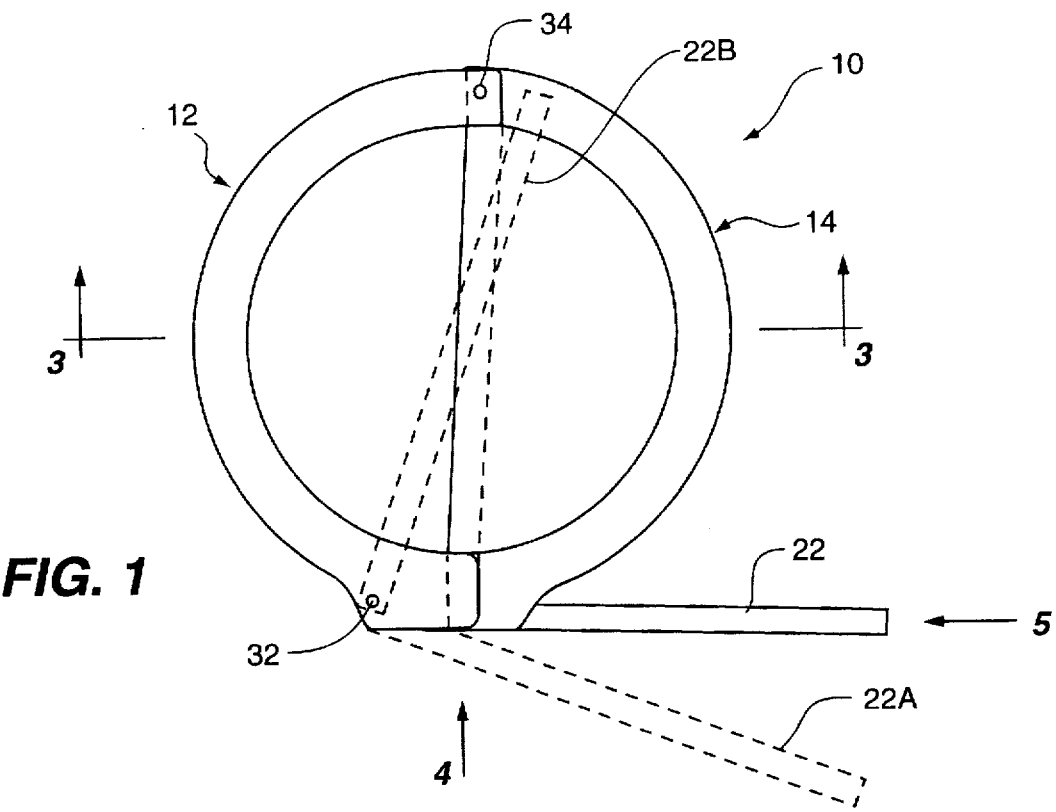
Figure 3:
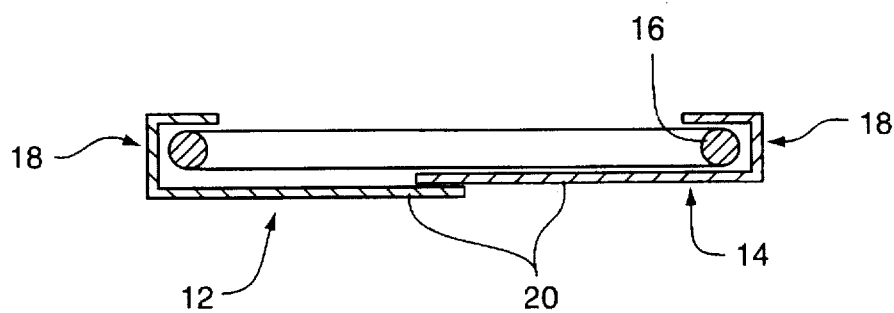
FIG. 3 is a section view along lines III—III of FIG. 1.
Figure 4:
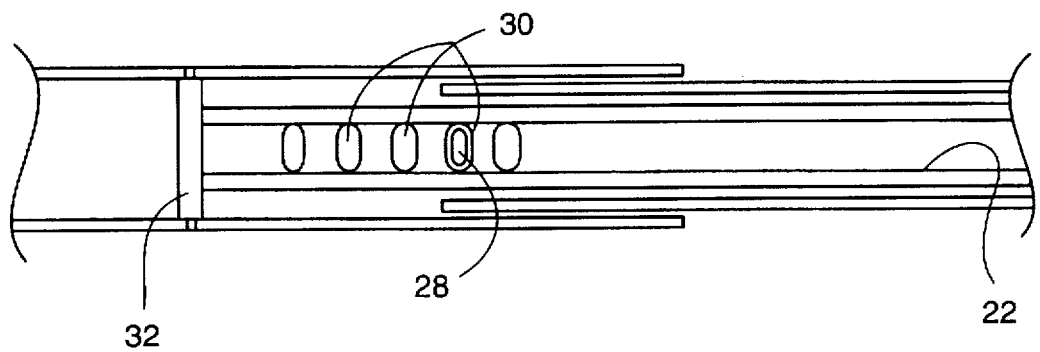
FIG. 4 is a view on the line IV shown in FIG. 1.
Figure 5:
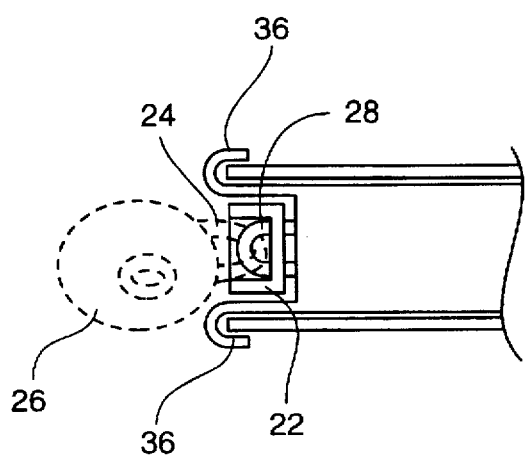
FIG. 5 is an enlarged detailed view taken on the line V of FIG. 1.

The clamp 10 shown in FIG. 1 is shown in the closed position. In that position a car steering wheel 16, shown in FIG. 3, will be encapsulated in the circular channel sections 18 formed at the outer arcuate edges of the parts 12 and 14.

Each of the parts 12 and 14 also has a flat plate 20 which covers the front of the steering wheel when the clamp is in the operative closed position. In the closed position, the steering wheel is completely obscured from a person sitting in the driving seat and it is not possible to saw the steering wheel without first sawing through the strong metal plate of the clamp. Furthermore, in order to remove the device, the complete extent of one of the halves must be sawed through or the points of attachment of the parts must be disconnected. Those points of attachment, which will be discussed in more detail below, can be concealed by or constructed of strong metal and, alternatively or additionally reinforced.

With the device in the operative position around a steering wheel, any attempt to rotate the steering wheel will either fail because the device will slide around the wheel or will be restricted because of abutment of a tangentially extending locking bar 22 with the legs of the driver or with a part of the vehicle.

Figure 2:
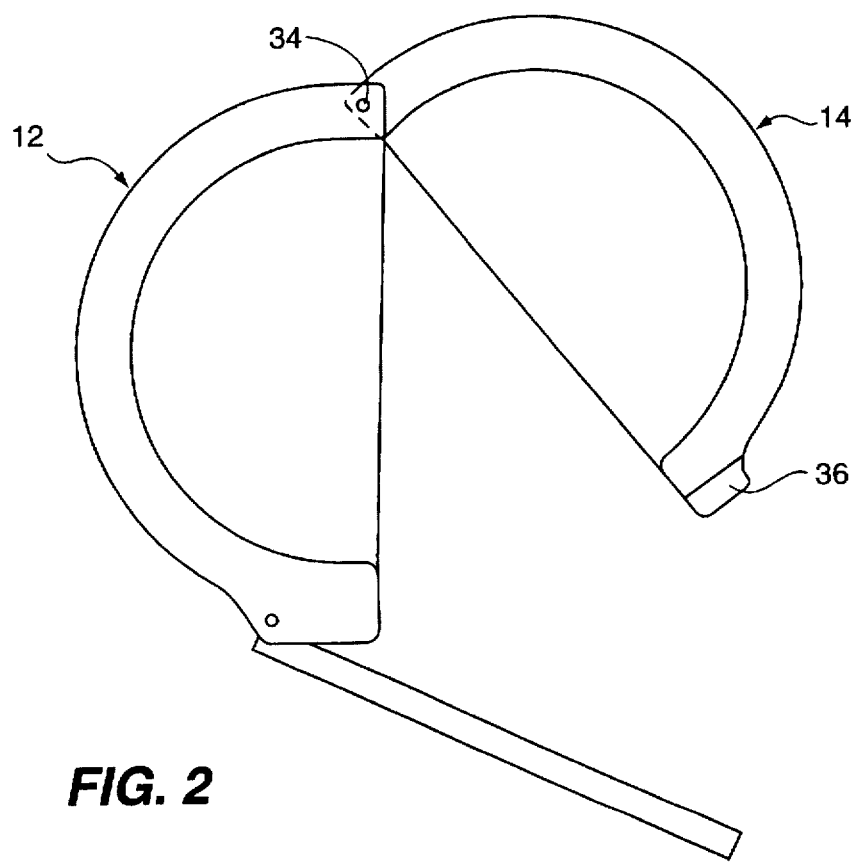
FIG. 2 is a view similar to FIG. 1 with the parts 12 and 14 in an open position.

In the operative position, the parts can be locked together by the hasp 24 of a padlock 26 passing through a loop 28 that is secured to the part 14 and which passes through a slot 30 of the locking bar. The padlock prevents the bar from pivoting about its mounting pin 32 to the position shown in chain lines in FIG. 1. With the bar in the position shown in FIG. 1, the parts 12 and 14 are prevented from pivoting to the open position shown in FIG. 2 about their pivot 34 by abutment of the loop 28 with the slot 30 of the locking bar.

It can be seen that the loop 28 and the hasp 24 of the padlock are concealed within a channel formed not only by the cross-section of the locking bar 22 but also by outwardly extending flanges of each part 12 and 14 on either side thereby rendering the loop and hasp virtually invulnerable to a sawing action. The outwardly extending flanges of the part 12 that extend each side of the loop may include a reinforcing plate on each side of twice the thickness of the metal to which it is attached. The flanges of the part 14 that similarly extend each side of the loop may also include or comprise a thicker piece of metal and that metal may be bent over as shown at 36. The reinforcing plates of the parts 12 can then slide into the bent over portion 36 of the part 14 in order to provide yet further resistance to a lever that may be inserted to try and prise the part away from each other.

In order to remove the device from a steering wheel the padlock is undone and the hasp removed from the loop 28. The bar 22 is then pivoted about the pin 32 to the position shown at 22A in order to move the slot 30 of the bar clear of the loop 28. When the slot and loop are clear of each other the parts 12 and 14 can be moved apart about their pivot 34 until there is sufficient clearance of the channels 18 from the steering wheel to allow the device to be lifted off. The device can then be moved to a compact storage position by pivoting the bar inwards to the position shown at 22B where it lies within the area bounded by the channel sections 18. Attachment of the device is a reversal of the removal process.

It can be seen that the locking bar 22 is provided with a series of slots 30 along its length in order that the parts can be locked together in a variety of different positions. This enables the device to be fitted to steering wheels of different diameters with the wheels still being located within the channels 18.

I claim:

1. A method of operating a steering wheel disabling device comprising pivotally moving parts (12,14) of the device to extend over opposed outwardly facing surfaces of a steering wheel (16) with a projection (22) of the device being caused to extend beyond the wheel thereby restricting rotation of the steering wheel and operating locking means (26,28,30) to prevent unauthorized removal of the device from the steering wheel and, prior to mounting the disabling device on the wheel, moving the projection pivotally about an axis on the opposite side of the device to that which the two parts are pivotally moved about to move the projection out of the space that is subsequently arranged to be occupied by the steering wheel.

2. A steering wheel disabling device for use in connection with a steering wheel to restrict rotation of the steering wheel, said device comprising:

a housing having a first closed configuration, and a second open configuration; said housing comprising two parts, each part having a flange portion creating a space adapted to house the steering wheel when in the first closed position; said two parts being movable with respect to one another from the first closed configuration to the second open configuration about a first hinge having a first axis of rotation;

a locking bar pivotally attached to said housing, said bar being movable between an extended position located outside the circumference of the flange portion of the housing, and a stored position located within said space adapted to house the steering wheel, said bar extending along and beyond the circumference of said flange portion for restricting rotation of the steering wheel by contact of the bar with surrounding vehicle structure when the bar is in said extended position and the housing is in said first closed configuration, said bar being pivotally connected to said housing at a second hinge and having a second axis of rotation which is parallel to the first axis of rotation;

in use, the housing being adapted to extend beyond the rim of the steering wheel and enclose the steering wheel to restrict in said first closed configuration with the locking bar restricting rotation thereof; the housing being adapted to be mountable on or removable from the steering wheel in the second open configuration; and the bar being pivotal from the extended position to the stored position when the housing is in the second configuration.

3. The steering wheel disabling device of claim 2 wherein said two part provide a channel through which the steering wheel is adapted to extend.

4. The steering wheel disabling device of claim 2 wherein said locking bar is movable from a first position in which the two parts are constrained and remain in the first closed configuration and a second position in which the two parts may be pivoted to the second open configuration.

5. The steering wheel disabling device of claim 4 wherein said locking bar connects the two parts at different relative distances from each other.

6. The steering wheel disabling device of claim 2 wherein said device is configured to obscure a locking device which cooperates with the disabling device to retain the locking bar in said extended position in the first closed configuration.

* * * * *